United States Patent [19]

Raty

[11] Patent Number: 5,131,789
[45] Date of Patent: Jul. 21, 1992

[54] MILL HOLE LINER RING CONNECTOR ASSEMBLY

[75] Inventor: Pertti T. Raty, Don Mills, Canada
[73] Assignee: Walter DiTullio, South Porcupine, Canada
[21] Appl. No.: 603,072
[22] Filed: Oct. 25, 1990
[30] Foreign Application Priority Data Oct. 25, 1989 [CA] Canada ................. 2001469

[51] Int. Cl.⁵ .............................................. E21D 11/00
[52] U.S. Cl. ................................... 405/153; 403/374; 52/584; 405/133
[58] Field of Search ............... 405/153, 133; 52/584; 403/374, 409.1

[56] References Cited

U.S. PATENT DOCUMENTS 2,134,008 10/1938 Sharp ........................... 403/409.1

FOREIGN PATENT DOCUMENTS 630280 10/1961 Canada .
709229 5/1965 Canada .
788806 7/1968 Canada .
808891 3/1969 Canada .
1053920 5/1979 Canada .
1182181 11/1964 Fed. Rep. of Germany ...... 405/133
2057034 3/1981 United Kingdom ............... 405/153

Primary Examiner—Andrew V. Kundrat
Attorney, Agent, or Firm—Browdy and Neimark

[57] ABSTRACT

A connector assembly for use in fastening two plate members together, particularly such members may be mill hole liner ring segments or mill hole liner rings which are fastened together to form a mill hole chute. The connector assembly is comprised of a connector tongue, connector clip and a wedge means. The connector clip is attached to a first plate member and extends outward perpendicularly from said plate member. The connector tongue is attached to a second plate member. In use the two plate members are aligned in edge to edge abutment so that the connector tongue is inserted through the aperture in the connector clip. A wedge means is then inserted through the aperture in the connector tongue. The wedge means is held in place by frictional forces between the wedge, the connector tongue and the connector clip. The wedge means is driven into the aperture causing the plate members to be connected and positioned in edge to edge alignment.

9 Claims, 2 Drawing Sheets

1

MILL HOLE LINER RING CONNECTOR ASSEMBLY

The present invention relates to a connector assembly which provides a unique means of fastening and securing two members together. In particular, this invention is related to a connector assembly which is used to secure together mill hole liner rings and their segments to form a mill hole chute.

BACKGROUND OF THE INVENTION

Mill hole chutes are used in mining operations to provide stable walls for mine passages in which ore, rock and other materials may be hauled. Chutes with steel-plate lined structures have been proposed.

Mill hole liner rings usually comprise a plurality of steel plates welded or otherwise connected together to form a short cylinder. Each cylinder is then welded or otherwise connected successively to another cylinder to form a mill hole chute.

There are many types of connectors which have been devised for assembling liner rings to form mill hole chutes.

A disadvantage of many connector assemblies of the prior art which are used in mill hole chutes is that they are very labour intensive and time-consuming. This results in high labour costs. Furthermore, the assembly of some of the prior art chutes requires special training and equipment. For example: Canadian Patent 788,806 entitled Angle Lug Chute shows a connector comprised of flanges with apertures for receiving a bolt which is then held in place with a nut; Canadian Patents 630,028 and 709,229 describe a steel mill hole form in which rods are inserted through several tubular members which are located on adjacent mill hole liner rings and segments and wherein the rods are then secured in place by a wedge means.

The prior art devices of Canadian Patents 788,806, 630,028, and 709,229 require very precise manufacture of the cylinder segments failing which the bolts or rods cannot be inserted through the apertures or tubular members of abutting cylinders. Even with precise manufacture of the cylinders, residual stresses from the manufacturing process or from transportation and handling can result in misalignment of the apertures. Misalignment results in increased time and labour costs being incurred as the segments and cylinders must be aligned using bars, clamps or pullers. Such alignment methods are particularly difficult when the mill hole chute is being assembled in the typically cramped quarters encountered in underground installations.

In U.S. Pat. No. Re. 21,101 a connector for a welding apparatus is described. The connector is comprised of a rectangular plate containing two apertures thereon. When the rectangular plate is placed over a first and second holding lug, wherein each holding lug is intimately attached to a first and second metal sheet, respectively, the metal sheets are held together. Each holding lug contains an aperture in which wedge means may then be inserted to lock the plates together. A further wedge means is described to align the plates more precisely.

U.S. Pat. No. Re 21,101 describes a three member (rectangular plate and two holding lugs) connector assembly with wedge means. The present invention is a two member (a first and second connector elements) connector assembly with wedge means. Therefore, the applicant's invention requires less components for a less complicated system.

U.S. Pat. No. Re. 21,101 describes a complicated connector system for aligning metal sheets temporarily in order to enable abutting edges to be welded together. The holding lugs must be permanently attached to the sheet metal at very precise distances in two directions. The rectangular plate in U.S. Pat. No. Re. 21,101 cannot be used to hold the metal sheets together if the holding lugs are not precisely mounted. To overcome the precision required in mounting the holding lugs, the apertures on the rectangular plate are made large enough to allow for the deviations in the location of the holding lugs so that a further wedge means must be used to lock the rectangular plate and hence plate members together.

The present invention requires that the connector clip and connector tongue of the connector assembly be precisely orientated and mounted in one direction only since they are located on the rim of each plate member. The location of the connector clip and connector tongue on the rim of the face of each plate member also allows for easier alignment of the two plate members than U.S. Pat. No. Re. 21,101 discloses.

Many of the connector assemblies which have been proposed for mill hole liner chutes have not overcome the problem of poor alignment between adjacent plates. Poor alignment results in loose seams which can contribute to an unstable structure.

DESCRIPTION OF DRAWINGS

The present invention will be better understood by the following description of the preferred embodiments of the connector assembly, with particular reference to the following drawings.

Referring to FIG. 1, the connector assembly (1) is comprised of a connector tongue (3) and a connector clip (2) and a wedge means (4).

The clip (2) is intimately attached to the edge of a first plate member (5) and extends outwards in a perpendicular manner from said plate member (5).

The connector tongue (3) is intimately attached to the edge of a second plate member (6).

Figure 1:
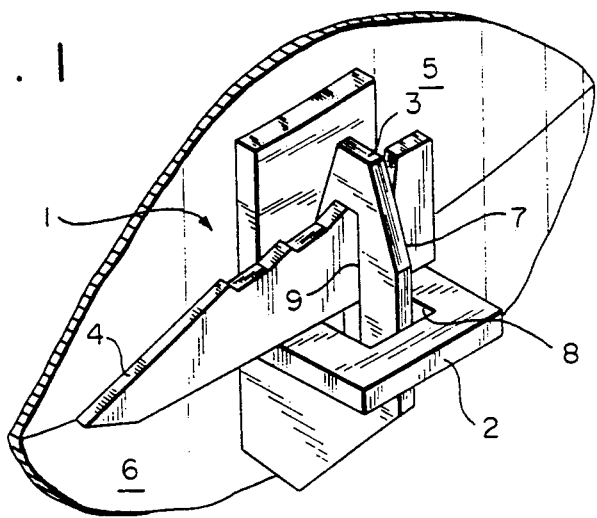
FIG. 1 is an enlarged view of one preferred embodiment of the connector assembly.

To describe the operation of the novel coupling assembly the two plate members (5,6) will be aligned in a horizontal fashion, as in FIG. 1.

The connector tongue (3) is intimately attached to the second plate member (6). The distal portion (7) of the connector tongue (3) has obliquely sloped upper sides. The horizontal cross-sectional area of the distal portion (7) of the connector tongue (3) is smaller than the horizontal area of the connector clip aperture (8), so that the connector tongue (3) is easily inserted therethrough.

The connector tongue (3) contains a second oblong aperture (9) which is disposed in a horizontal fashion with the oblong dimension in the vertical direction. A wedge means (4) is then inserted through the oblong aperture (9).

Figure 6A:
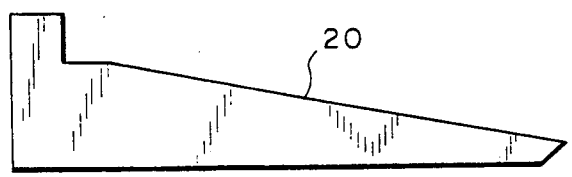
FIGS. 6A and 6B are plan views of two preferred embodiments of the wedge means.
Figure 6B:
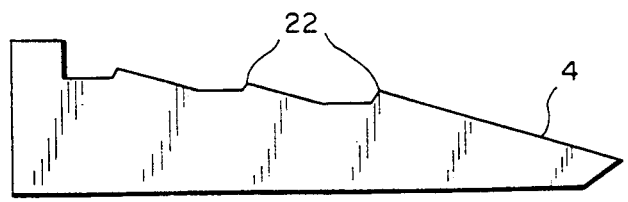

FIG. 6 shows two preferred wedge embodiments (4) and (20).

The wedge means (4, 20) is adapted to be inserted into the oblong aperture (9) of the connector tongue (3) in such a manner that the insertion of the wedge means (4, 20) exerts a component of force vertically up to the upper portion of the aforementioned oblong aperture (9) and vertically down to the upper face of the connector clip (2). The wedge means is inserted into the oblong aperture (9) and driven in by means of, for example, a hammer.

The first wedge means (4) has protuberances (22) which are dimensionally and orientationally arranged such that after the upper edge of the first liner ring (6) and the lower edge of the second liner ring are brought into contact, the further driving in of the wedge means (4) causes the connector clip to elastically deflect downwards and thus store energy. As the protuberance on the wedge means is driven past the connector tongue, the connector clip is allowed to spring upward and release a portion of the previously stored energy and concomitantly effect locking of the wedge means.

The second wedge means (20) does not contain protuberances (22). This wedge means (20) is held in place by the frictional forces between the wedge (20), the connector tongue (3) and the connector clip (2).

Figure 3:
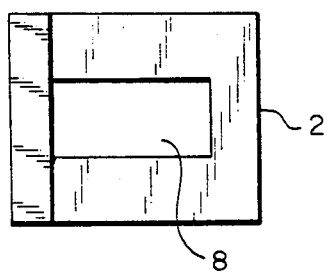
FIG. 3 is a plan view of a preferred embodiment of the connector clip of the connector assembly.
Figure 4:
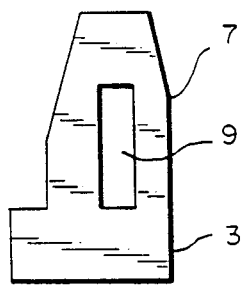
FIG. 4 is a plan view of a preferred embodiment of the connector tongue of the connector assembly.

FIG. 3 shows a preferred embodiment of the connector clip (2) and its aperture (8). FIG. 4 shows a preferred embodiment of the connector tongue (3), its distal portion (7) and its oblong aperture (9).

Figure 2:
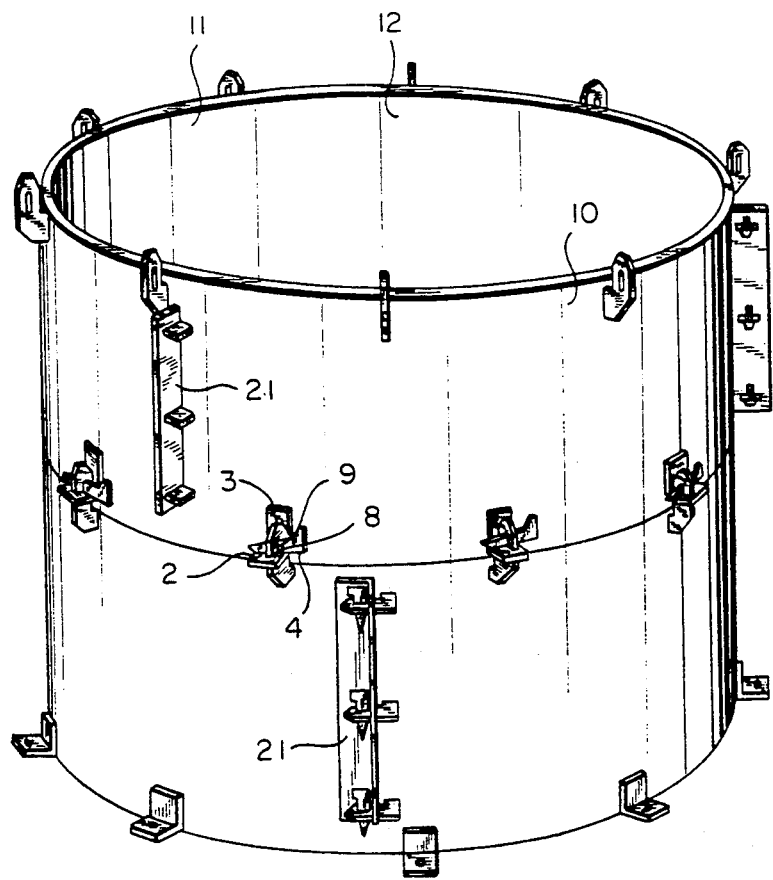
FIG. 2 is a perspective view of a portion of one preferred embodiment of the assembled mill hole chute.

To describe the operation of the novel coupling method and apparatus, the first mill hole liner ring (6) will be positioned upright, i.e., its longitudinal axis vertical as shown in FIG. 2. (Any other orientation can be used for installation.)

To the upper outer edge or rim of the first liner ring (6) there are a multiplicity of connector tongues (3).

To the outer lower edge or rim of the second liner ring (5) there are fixedly coupled and equally spaced a multiplicity of connector clips (2).

The centre lines of the connector tongues (3) and the centre lines through the apertures (8) of the connector clips (2) are with respect to the centre line of the liner rings (5, 6) equiangular and radially equidistant. To couple the first liner ring (6) to the second liner ring (5), the second liner ring (5) is brought above the first ring (6) such that the centre lines are collinear and angularly oriented such that the centre lines the apertures (8) in the clips (2) of the second ring and the centre lines of the connector tongues (3) the first ring (6) are also collinear. The second ri (5) is lowered until the obliquely sloped upper faces of the connector tongues (3) on the first ring (6) contact the sides of the apertures (8) of the clips (2) on the second ring (5).

The wedge means (4) are then inserted through the oblong apertures (9) of the connector tongues (3) where they are driven in by mechanical force, i.e., a hammer.

Figures 5A, 5B:
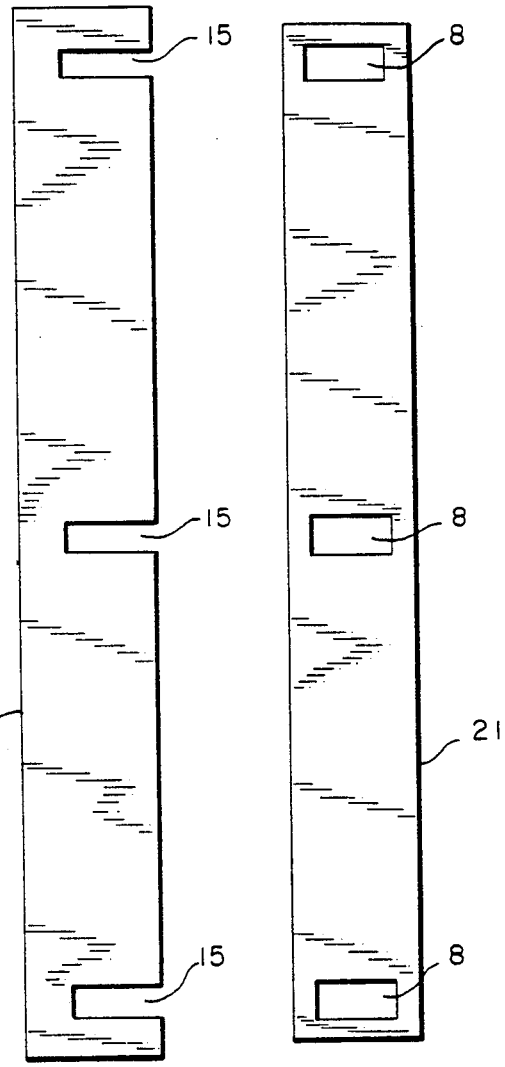
FIGS. 5A and 5B are plan views of two preferred embodiments of the tie bar.

Each mill hole liner ring is comprised of three segments (10, 11, 12). The connector assembly (1) is used to fasten the segments together in a slightly different manner than that which is used to fasten one ring to the next. Instead of several connector assemblies (1) with several clips (2), a tie bar is used with a plurality of connector tongues. Referring to FIG. 5, this tie bar (21) of the first preferred embodiment contains three apertures (8). The tie bar (14) of the second preferred embodiment contains three channels (15). The tie bars (21, 14) are long rectangular members which are attached in a perpendicular fashion to alternating sides of the mill hole ring segments (10, 11 and 12). The connector tongue (3) is intimately attached to the opposite side of the adjacent segment (10, 11, 12) directly opposite the apertures (8) or channels (15) of the tie bars (21, 14).

The segments are coupled together in the same manner as the rings were coupled. The segments are brought together so that the centre lines of the connector tongues (3) and the centre lines through the apertures (8) or channels (15) are collinear. The connector tongues (3) are then inserted through the apertures (8) or channels (15) of the tie bars. The wedge means (4, 20) is inserted and driven through the oblong aperture (9) of the connector tongue.

The connector assembly of the present invention has been disclosed for coupling mill hole liner rings and their segments, to form mill hole chutes. However, from the foregoing it is apparent that the connector assembly can be used in other applications which require the coupling of two metal sheets. For example, the connector assembly could be used to couple together two pipes.

Preferred embodiments of the connector assembly, particularly in reference to a mill hole chute have been described. However, it is to be understood that many modifications and changes in the construction and arrangement may be made without departing from the spirit and scope of the invention as disclosed.

The embodiments of the invention in which an exclusive property or privilege is claimed are defined as follows:

1. A connector assembly comprising:
   a first connector member connected to the rim of the face of a first plate member, wherein the first connector member is in parallel with the ball and extends past the rim of the first plate member, wherein the first connector member has an upper portion with obliquely sloped upper sides, wherein the distal tip of said first connector member has an aperture outwardly disposed from the first plate member, and wherein the aperture is adapted for the insertion of a wedge means;
   a second connector member connected to the rim of the face of a second plate member in a perpendicular outwardly disposed manner, wherein the outwardly disposed portion extends perpendicularly from the face of the second plate member, wherein the second connector member contains one or more channels or apertures which extend in a perpendicular fashion from the second plate member, wherein the horizontal cross-sectional area of the channel or aperture is substantially larger than the horizontal cross-sectional area of said distal tip of the first connector member, wherein the centre lines of the first connector members and the centre lines of the apertures in the second connector member are continuous such that when said first connector member is inserted through said aperture or channel of said second connector member the centre lines are collinear, and wherein the oblong aperture of the first connector member is adapted to receive a wedge means which may be driven into said aperture by force to provide a self-locking mechanism, wherein the said first and second plate members are secured together.

2. The connector assembly of claim 1 wherein the base portion of the said first connector member is perpendicular to the first plate member forming an acute-angled first connector member, wherein said base portion is secured to the first plate member, and the upper portion of the second connector member is secured to a second plate member, forming an acute-angled second connector member, wherein the first connector member is adapted to be inserted through the aperture of the second connector member and the oblong aperture of the first connector member is adapted to receive a wedge means thereby providing a self-locking mechanism, wherein the said first and second plate members may be secured together.

3. The connector assembly of claim 1 wherein the first and second plate members are segments of mill hole liner rings, wherein a plurality of segments are connected together with a plurality of said connector assemblies to form a mill hole liner ring.

4. The connector assembly of claim 1 wherein the first and second plate members are mill hole liner rings, wherein a plurality of mill hole liner rings are connected together with a plurality of said connector assemblies to form a mill hole chute.

5. A mill hole liner ring comprising a plurality of separate substantially uniform segments, wherein each segment comprises side edges for substantial abutment with side edges of adjoining segments to form one cylindrical mill hole liner ring, wherein the side edges of adjoining segments each have a plurality of said connector assemblies according to claim 1 for securing said segments together to form said cylindrical mill hole liner ring.

6. A mill hole liner ring according to claim 5, wherein said mill hole liner ring comprises three substantially uniform segments.

7. A mill hole liner ring according to claim 1, wherein the second connector member of the connector assembly is a tie bar, wherein said tie bar secures the segments together, and wherein the tie bar is substantially the length of the side edge of said segments and is attached thereon.

8. A mill hole chute comprising several mill hole liner rings secured together with a plurality of connector assemblies according to claim 6 to provide an axially aligned cylindrical mill hole chute.

9. A mill hole chute comprising several mill hole liner rings according to claim 7, wherein the mill hole liner rings are connected together with said tie bar of said connector assembly to form an axially aligned cylindrical mill hole chute.

* * * * *